United States Patent
Hoang et al.

(10) Patent No.: US 12,242,801 B2
(45) Date of Patent: Mar. 4, 2025

(54) BLENDING GRAPH PREDICTIONS

(71) Applicant: International Business Machines Corporation, Armonk, NY (US)

(72) Inventors: Thanh Lam Hoang, Maynooth (IE); Gabriele Picco, Dublin (IE); Yufang Hou, Dublin (IE); Young-Suk Lee, Mahopac, NY (US); Lam Minh Nguyen, Ossining, NY (US); Dzung Tien Phan, Pleasantville, NY (US); Vanessa Lopez Garcia, Dublin (IE); Ramon Fernandez Astudillo, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 530 days.

(21) Appl. No.: 17/666,827

(22) Filed: Feb. 8, 2022

(65) Prior Publication Data
US 2023/0252234 A1    Aug. 10, 2023

(51) Int. Cl.
*G06F 40/205*  (2020.01)
*G06F 40/30*   (2020.01)

(52) U.S. Cl.
CPC ............ *G06F 40/205* (2020.01); *G06F 40/30* (2020.01)

(58) Field of Classification Search
None
See application file for complete search history.

(56) References Cited

U.S. PATENT DOCUMENTS

| 10,552,465 | B2  |   | 2/2020  | Kenthapadi |
| 11,442,963 | B1  | * | 9/2022  | Lecue ................... G06F 16/906 |
| 2016/0350384 | A1 |   | 12/2016 | Anchuri |
| 2017/0124452 | A1 |   | 5/2017  | Tucker |
| 2019/0095806 | A1 | * | 3/2019  | Martinez Canedo ... G06F 18/21 |
| 2020/0057946 | A1 | * | 2/2020  | Singaraju ............... G06N 5/022 |

FOREIGN PATENT DOCUMENTS

KR    1020210067278 A    6/2021

OTHER PUBLICATIONS

"mdtux89 / amr-evaluation", GitHub, downloaded from the Internet on Dec. 21, 2021, 4 pages, <https://github.com/mdtux89/amr-evaluation>.

(Continued)

*Primary Examiner* — Antim G Shah
(74) *Attorney, Agent, or Firm* — Daniel M. Yeates

(57) ABSTRACT

Software that performs the following operations: (i) receiving a set of graph predictions corresponding to an input text, where graph predictions of the set of graph predictions are generated by different respective machine learning models; (ii) blending the graph predictions of the set of graph predictions to generate a plurality of candidate blended graphs, where nodes and edges of the candidate blended graphs have respective selection metric values, generated using a selection metric function, that meet a minimum threshold; and (iii) selecting as an output blended graph a candidate blended graph of the plurality of candidate blended graphs having a highest total combination of selection metric values among the plurality of candidate blended graphs.

18 Claims, 13 Drawing Sheets

An example AMR graph for the sentence *You told me to wash the dog.*

(56) References Cited

OTHER PUBLICATIONS

"stanfordnlp / stanza", GitHub, downloaded from the Internet on Dec. 21, 2021, 13 pages, <https://github.com/stanfordnlp/stanza/>.

"Abstract Meaning Representation Download", AMR, downloaded from the Internet on Dec. 21, 2021, 2 pages, <https://amr.isi.edu/download.html>.

"bjascob / amrlib", GitHub, downloaded from the Internet on Dec. 21, 2021, 1 page, <https://github.com/bjascob/amrlib/tree/master/scripts>.

"IBM / graph_ensemble_learning", GitHub, downloaded from the Internet on Dec. 21, 2021, 12 pages, <https://github.com/IBM/graph_ensemble_learning>.

"IBM / transition-amr-parser", GitHub, downloaded from the Internet on Dec. 21, 2021, 9 pages, <https://github.com/IBM/transition-amr-parser>.

"jcyk / AMR-gs", GitHub, downloaded from the Internet on Dec. 21, 2021, 7 pages, <https://github.com/jcyk/AMR-gs>.

"SapienzaNLP / spring", GitHub, downloaded from the Internet on Dec. 15, 2021, 10 pages, <https://github.com/SapienzaNLP/spring>.

"sklearn.ensemble.VotingClassifier", downloaded from the Internet on Dec. 15, 2021, 7 pages, <https://scikit-learn.org/stable/modules/generated/sklearn.ensemble.VotingClassifier.html>.

Bahiense et al., "The maximum common edge subgraph problem: A polyhedral investigation", Discrete Applied Mathematics 160 (2012), Available online Feb. 17, 2012, pp. 2523-2541.

Banarescu et al., "Abstract Meaning Representation for Sembanking", proceedings of the 7th Linguistic Annotation Workshop & Interoperability with Discourse, Sofia, Bulgaria, Aug. 8-9, 2013, pp. 178-186.

Bevilacqua et al., "One SPRING to Rule Them Both: Symmetric AMR Semantic Parsing and Generation without a Complex Pipeline", The Thirty-Fifth AAAI Conference on Artificial Intelligence (AAAI-21), pp. 12564-12573.

Bies et al., "English Web Treebank", Linguistic Data Consortium, University of Pennsylvania, 2 pages, <https://catalog.ldc.upenn.edu/LDC2012T13>.

Breiman, Leo, "Bagging Predictors", Technical Report No. 421, Sep. 1994, Machine learning, 20 pages.

Cai et al., "AMR Parsing via Graph Sequence Iterative Inference", Proceedings of the 58th Annual Meeting of the Association for Computational Linguistics, Jul. 5-10, 2020, pp. 1290-1301.

Cai et al., "Smatch: an Evaluation Metric for Semantic Feature Structures", Proceedings of the 51st Annual Meeting of the Association for Computational Linguistics, pp. 748-752, Sofia, Bulgaria, Aug. 4-9, 2013.

Chen et al., "XGBoost: A Scalable Tree Boosting System", arXiv:1603.02754v3 [cs.LG] Jun. 10, 2016, KDD '16, Aug. 13-17, 2016, San Francisco, CA, USA, 13 pages.

Damonte et al., "An Incremental Parser for Abstract Meaning Representation", Proceedings of the 15th Conference of the European Chapter of the Association for Computational Linguistics: vol. 1, Long Papers, Apr. 3-7, 2017, Valencia, Spain, pp. 536-546.

Domingos, Pedro, "A Unified Bias-Variance Decomposition and its Applications", In Proceedings of 17th International Conference on Machine Learning, pp. 231-238, 2000.

Dong et al., "A survey on ensemble learning", Front. Comput. Sci., 2020, 14(2): pp. 241-258, https://doi.org/10.1007/s11704-019-8208-z.

Goyal et al., "Graph Representation Ensemble Learning", arXiv:1909.02811v2 [cs.SI] Sep. 12, 2019, 9 pages.

Kapanipathi et al., "Leveraging Abstract Meaning Representation for Knowledge Base Question Answering", arXiv:2012.01707v2 [cs.CL] Jun. 2, 2021, 11 pages.

Konstas et al., Neural AMR: Sequence-to-Sequence Models for Parsing and Generation, arXiv:1704.08381v3 [cs.CL] Aug. 18, 2017, 11 pages.

Kuncoro et al., "Distilling an Ensemble of Greedy Dependency Parsers into One MST Parser", Proceedings of the 2016 Conference on Empirical Methods in Natural Language Processing, Austin, Texas, Nov. 1-5, 2016, pp. 1744-1753.

Lam et al., "Ensembling Graph Predictions for AMR Parsing", arXiv:2110.09131v1 [cs.CL] Oct. 18, 2021, 35th Conference on Neural Information Processing Systems (NeurIPS 2021), 15 pages, Grace Period Disclosure Document.

Lee et al., "Pushing the Limits of AMR Parsing with Self-Learning", arXiv:2010.10673v1 [cs.CL] Oct. 20, 2020, 7 pages.

Li et al., Efficient One-Pass End-to-End Entity Linking for Questions, Proceedings of the 2020 Conference on Empirical Methods in Natural Language Processing, pp. 6433-6441, Nov. 16-20, 2020.

Lim et al., "I Know What You Asked: Graph Path Learning using AMR for Commonsense Reasoning", Proceedings of the 28th International Conference on Computational Linguistics, Barcelona, Spain (Online), Dec. 8-13, 2020, pp. 2459-2471.

Pan et al., "Graph Ensemble Boosting for Imbalanced Noisy Graph Stream Classification", IEEE Transactions on Cybernetics, vol. 45, No. 5, May 2015, pp. 940-954.

Raffel et al., "Exploring the Limits of Transfer Learning with a Unified Text-to-Text Transformer", arXiv:1910.10683v3 [cs.LG] Jul. 28, 2020, Journal of Machine Learning Research 21 (2020), pp. 1-67.

Roukos et al., "Getting AI to reason: using neuro-symbolic AI for knowledge-based question answering", IBM Research, Blog, Dec. 4, 2020, 19 pages, <https://research.ibm.com/blog/ai-neurosymbolic-common-sense>.

Sagae et al., "Parser Combination by Reparsing", Proceedings of the Human Language Technology Conference of the North American Chapter of the ACL, New York, Jun. 2006, pp. 129-132.

Shapire et al., "Boosting—Foundations and Algorithms", 48740_7P_8291_000.tex, Oct. 1, 2012, 528 pages.

Valentini et al., "Bias-Variance Analysis of Support Vector Machines for the Development of SVM-Based Ensemble Methods", Journal of Machine Learning Research 5 (2004), pp. 725-775.

Van Noord et al., "Neural Semantic Parsing by Character-based Translation: Experiments with Abstract Meaning Representations", arXiv:1705.09980v2 [cs.CL] Oct. 9, 2017, 16 pages.

Vaswani et al., "Attention Is All You Need", 31st Conference on Neural Information Processing Systems (NIPS 2017), Long Beach, CA, USA, 11 pages.

Xu et al., "Improving AMR Parsing with Sequence-to-Sequence Pre-training", arXiv:2010.01771v1 [cs.CL] Oct. 5, 2020, 11 pages.

Zhou et al., "AMR Parsing with Action-Pointer Transformer", arXiv:2104.14674v3 [cs.CL] May 18, 2021, 14 pages.

* cited by examiner

An example AMR graph for the sentence You told me to wash the dog.

Algorithm 1: Graph ensemble with the Graphene algorithm.

Input: a set of graphs $G = \{g_1, g_2, \ldots, g_m\}$ and the support threshold $\theta$
Output: an ensemble graph $g^e$
Algorithm: Graphene($G$, $\theta$)

for $i \leftarrow 1$ to $m$ do
    $g_{pivot} \leftarrow g_i$
    $V \leftarrow$ Initialise($g_{pivot}$)
    for $j \leftarrow 1$ to $m$ do
        if $j \neq i$ then
            $V \leftarrow V \cup$ getVote($\phi(g_{pivot}, g_j)$)
    end
    $g_i^e \leftarrow$ Filter($V$, $\theta$)
end
$g^e \leftarrow$ the graph with the largest support among $g_1^e, \ldots, g_m^e$
Return $g^e$

| Datasets | AMR 2.0 | AMR 3.0 | BIO | Little Prince (LP) | New3 |
|---|---|---|---|---|---|
| Training | 36,521 | 55,635 | n/a | n/a | n/a |
| Dev | 1,368 | 1,722 | n/a | n/a | n/a |
| Test | 1,371 | 1,898 | 6,952 | 1,562 | 527 |

FIG. 7

Results on the test splits of the AMR 2.0 and AMR 3.0 dataset.

| Models | Smatch | Unl. | NWSD | Con. | NE | Neg. | Wiki. | Reen. | SRL |
|---|---|---|---|---|---|---|---|---|---|
| AMR 2.0 | | | | | | | | | |
| SPRING | 84.22 | 87.38 | 84.72 | 89.98 | 90.77 | 72.65 | 82.76 | 74.30 | 82.89 |
| APT | 82.70 | 86.18 | 83.23 | 89.48 | 90.20 | 67.27 | 78.87 | 73.19 | 82.01 |
| T5 | 82.98 | 86.17 | 83.43 | 89.85 | 90.65 | 73.43 | 77.99 | 72.44 | 82.02 |
| Cai&Lam | 80.15 | 83.60 | 80.66 | 87.39 | 82.25 | 78.09 | 85.36 | 66.46 | 77.35 |
| Graphene 4S | 84.78 | 87.96 | 85.29 | 90.64 | 92.19 | 75.22 | 83.88 | 71.42 | 83.46 |
| Graphene All | 85.85 | 88.68 | 86.35 | 91.23 | 92.30 | 77.01 | 84.63 | 74.49 | 84.41 |
| AMR 3.0 | | | | | | | | | |
| SPRING | 83.25 | 86.40 | 83.71 | 89.38 | 87.80 | 72.94 | 81.22 | 73.33 | 81.97 |
| APT | 80.57 | 83.96 | 81.07 | 88.38 | 86.82 | 68.69 | 76.88 | 70.78 | 80.17 |
| T5 | 82.17 | 85.22 | 82.66 | 89.03 | 86.99 | 72.59 | 73.78 | 72.18 | 81.18 |
| Graphene 4S | 83.77 | 86.89 | 84.23 | 90.09 | 88.27 | 74.60 | 81.92 | 70.22 | 82.46 |
| Graphene All | 84.41 | 87.35 | 84.83 | 90.51 | 88.64 | 74.76 | 82.25 | 71.93 | 83.15 |

FIG. 8

Results of out-of-distribution evaluation on the BIO, New3, and Little Prince dataset.

| Models | Smatch | Unl. | NWSD | Con. | NE | Neg. | Wiki. | Reen. | SRL |
|---|---|---|---|---|---|---|---|---|---|
| BIO | | | | | | | | | |
| SPRING | 60.52 | 65.33 | 61.42 | 67.76 | 33.92 | 65.68 | 3.80 | 51.19 | 62.86 |
| APT | 51.23 | 56.27 | 51.81 | 58.22 | 15.68 | 52.91 | 3.62 | 43.53 | 54.24 |
| T5 | 58.89 | 63.86 | 59.69 | 66.63 | 30.42 | 65.11 | 2.46 | 48.56 | 61.47 |
| Cai&Lam | 42.22 | 49.78 | 42.85 | 47.10 | 5.19 | 51.42 | 7.32 | 39.23 | 51.00 |
| Graphene 4S | 61.51 | 66.22 | 62.28 | 68.48 | 33.02 | 68.24 | 4.46 | 50.40 | 63.70 |
| Graphene All | 62.29 | 66.89 | 63.07 | 68.64 | 32.62 | 69.48 | 4.54 | 52.06 | 64.21 |
| NEW3 | | | | | | | | | |
| SPRING | 74.66 | 78.99 | 75.21 | 82.38 | 67.52 | 67.48 | 67.20 | 66.47 | 75.65 |
| APT | 71.06 | 75.92 | 71.58 | 80.34 | 65.65 | 67.08 | 57.14 | 63.02 | 73.40 |
| T5 | 73.04 | 77.30 | 73.68 | 82.65 | 68.24 | 64.20 | 56.42 | 64.65 | 75.03 |
| Cai&Lam | 60.81 | 66.00 | 61.29 | 72.79 | 45.60 | 59.57 | 46.39 | 57.70 | 68.87 |
| Graphene 4S | 74.84 | 79.23 | 75.30 | 82.56 | 69.98 | 69.51 | 68.34 | 63.53 | 76.31 |
| Graphene All | 75.60 | 79.64 | 76.14 | 83.08 | 68.40 | 69.62 | 67.98 | 67.16 | 76.88 |
| Little Prince | | | | | | | | | |
| SPRING | 77.85 | 82.31 | 78.85 | 84.68 | 60.53 | 70.72 | 60.53 | 68.28 | 77.78 |
| APT | 75.21 | 80.07 | 76.12 | 85.29 | 65.15 | 67.92 | 69.70 | 63.28 | 75.31 |
| T5 | 77.66 | 81.99 | 78.53 | 85.12 | 58.06 | 72.33 | 59.35 | 67.03 | 78.30 |
| Cai&Lam | 71.03 | 75.91 | 72.07 | 80.18 | 22.73 | 57.51 | 31.50 | 59.29 | 72.02 |
| Graphene 4S | 77.91 | 82.40 | 78.86 | 84.91 | 61.54 | 73.58 | 60.65 | 64.77 | 78.12 |
| Graphene All | 78.54 | 82.81 | 79.44 | 85.52 | 64.05 | 75.11 | 63.45 | 67.83 | 78.72 |

FIG. 9

| | AMR 2.0 | | AMR 3.0 | | BIO | | LP | | New3 | |
|---|---|---|---|---|---|---|---|---|---|---|
| | Sup. | Smat. | Sup. | Smat. | Sup. | Smat. | Sup. | Smat. | Sup. | Smat. |
| SPRING | 170.15 | 84.08 | 136.90 | 83.14 | 166.86 | 60.52 | 69.33 | 77.85 | 118.27 | 74.66 |
| SPR. pivot | 172.70 | 84.70 | 139.42 | 83.73 | 169.97 | 61.56 | 70.97 | 78.22 | 120.85 | 74.83 |
| Graphene | 175.73 | 85.85 | 142.07 | 84.43 | 179.38 | 62.29 | 72.64 | 78.54 | 123.62 | 75.60 |

1100

1200

1300

| | θ = 0.1 | θ = 0.3 | θ = 0.5 | θ = 0.7 | θ = 0.9 |
|---|---|---|---|---|---|
| Smatch | 81.64 | 85.01 | 85.49 | 85.12 | 83.68 |
| Precision | 76.13 | 83.62 | 85.86 | 86.53 | 86.54 |
| Recall | 88.00 | 86.55 | 85.13 | 83.75 | 81.01 |

| | AMR 2.0 | AMR 3.0 | BIO | New3 | LP |
|---|---|---|---|---|---|
| Uniform Sampling | 82.58 | 82.98 | 56.00 | 71.18 | 76.17 |
| Ideal Median | 83.80 | 83.66 | 57.72 | 73.06 | 77.14 |
| Graphene | 85.85 | 84.41 | 62.29 | 75.60 | 78.54 |

FIG. 14

1500a
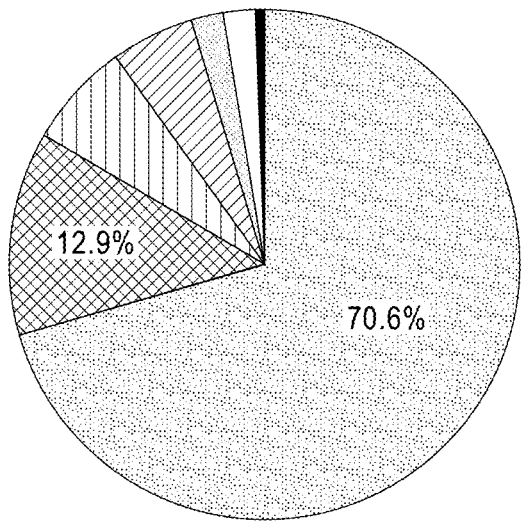
Model Pivot Selection New3
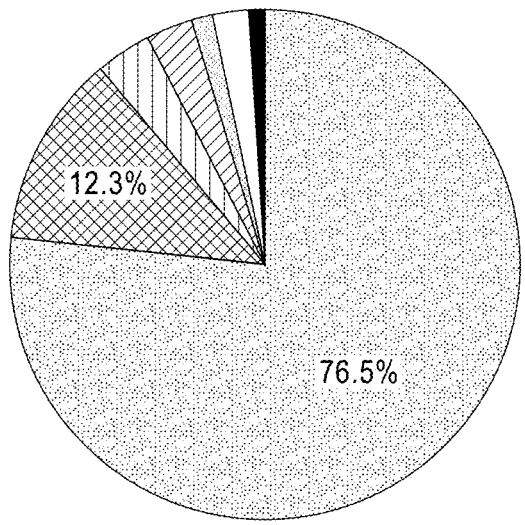
Model Pivot Selection Little Prince
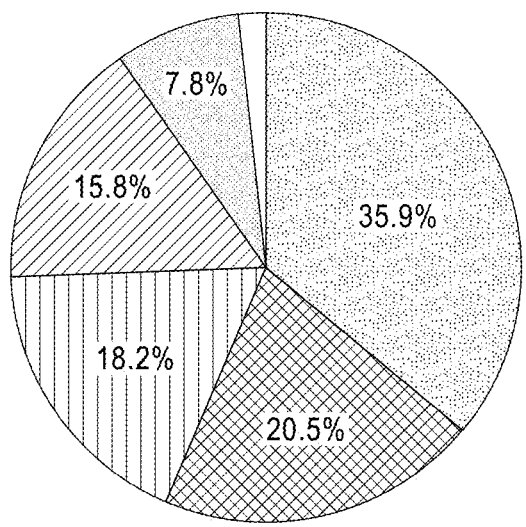
Model Pivot Selection Bio
FIG. 15A 1500b
Model Pivot Selection AMR 3.0
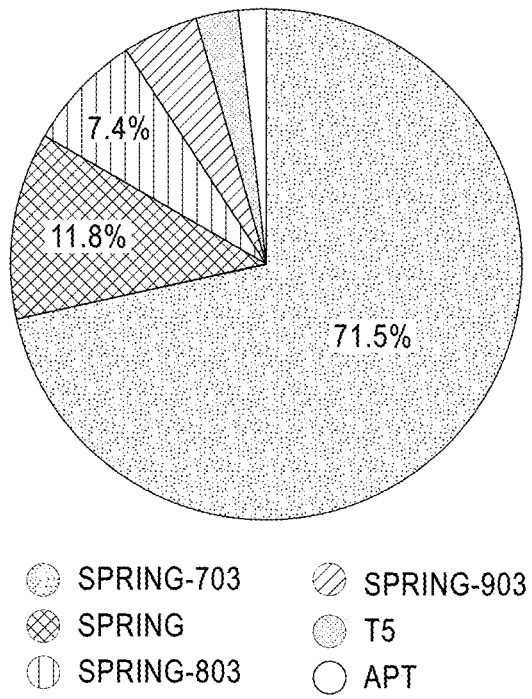
- SPRING-703
- SPRING
- SPRING-803
- SPRING-903
- T5
- APT
Model Pivot Selection AMR 2.0
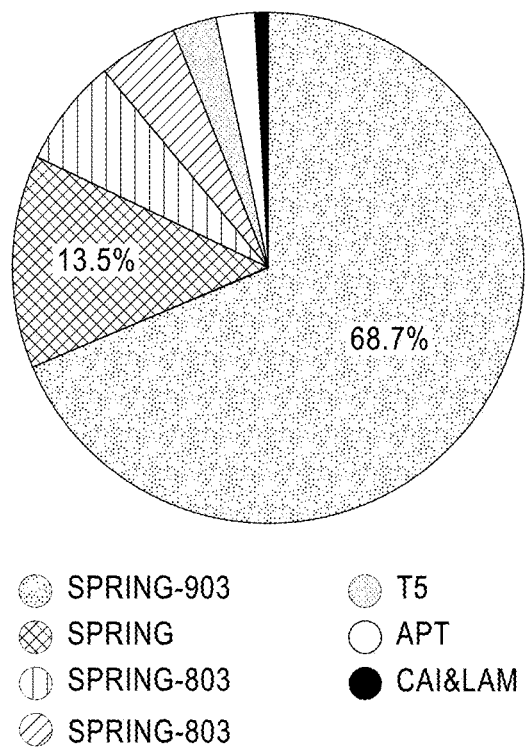
- SPRING-903
- SPRING
- SPRING-803
- SPRING-803
- T5
- APT
- CAI&LAM
FIG. 15B

1600

|Method/Data|Sample rate 0.6 | | | |Sample rate 0.8 | | | |
|---|---|---|---|---|---|---|---|---|
| | AMR 2.0 | BIO | New3 | LP | AMR 2.0 | BIO | New3 | LP |
| SPRING 603 | 82.40 | 58.22 | 73.81 | 76.75 | 83.28 | 58.85 | 74.13 | 76.96 |
| SPRING 703 | 82.74 | 57.93 | 73.49 | 76.60 | 83.43 | 59.50 | 74.71 | 77.40 |
| SPRING 803 | 82.85 | 58.72 | 73.42 | 76.68 | 83.39 | 58.97 | 73.57 | 77.39 |
| SPRING 903 | 82.81 | 58.80 | 74.09 | 76.96 | 83.12 | 57.52 | 73.50 | 76.70 |
| T5 | 82.08 | 56.46 | 72.84 | 76.31 | 82.59 | 58.69 | 73.42 | 77.70 |
| Graphene | 84.20 | 61.66 | 75.01 | 77.79 | 84.70 | 62.23 | 75.98 | 78.09 |

| Graphene Models | S | S703 | S803 | S903 | T5 | APT | Cai&Lam |
|---|---|---|---|---|---|---|---|
| AMR 2.0 | 85.66 | 85.77 | 85.81 | 85.87 | 85.65 | 85.67 | 85.11 |
| AMR 3.0 | 84.44 | 84.42 | 84.34 | 84.44 | 84.35 | 84.18 | NA |
| Bio | 62.39 | 62.41 | 62.39 | 62.44 | 62.38 | 62.14 | 62.34 |
| LP | 78.65 | 78.63 | 78.75 | 78.70 | 78.65 | 78.23 | 77.75 |
| New3 | 75.65 | 75.69 | 75.88 | 75.82 | 75.78 | 75.48 | 74.92 |

| Graphene Models | AMR 2.0 | AMR 3.0 | Bio | LP | New3 |
|---|---|---|---|---|---|
| Graphene 4SATC | 85.52 | 84.27 | 62.39 | 78.50 | 75.66 |

FIG. 18

BLENDING GRAPH PREDICTIONS

STATEMENT REGARDING PRIOR DISCLOSURES BY THE INVENTOR OR A JOINT INVENTOR

The following disclosure(s) are submitted under 35 U.S.C. 102(b)(1)(A) as prior disclosures by, or on behalf of, a sole inventor of the present application or a joint inventor of the present application:
(i) LAM et al., "Ensembling Graph Predictions for AMR Parsing", arXiv:2110.09131v1 [cs.CL] 18 Oct. 2021, 35th Conference on Neural Information Processing Systems (NeurIPS 2021), 15 pages.

BACKGROUND

The present invention relates generally to the field of machine learning, and more particularly to graph-based machine learning model predictions.

Graph data structures typically include a plurality of nodes connected by edges, with the nodes and edges often having respective labels. An example of a graph is an abstract meaning representation (AMR), which provides a semantic representation of the words in a sentence. Often, machine learning models are trained to predict structure data such as graphs for application to various tasks and/or domains.

Ensemble learning is a subset of machine learning where multiple machine learning algorithms are combined to obtain better predictive performance than could be obtained from any of the individual algorithms alone.

SUMMARY

According to an aspect of the present invention, there is a method, computer program product and/or system that performs the following operations (not necessarily in the following order): (i) receiving a set of graph predictions corresponding to an input text, where graph predictions of the set of graph predictions are generated by different respective machine learning models; (ii) blending the graph predictions of the set of graph predictions to generate a plurality of candidate blended graphs, where nodes and edges of the candidate blended graphs have respective selection metric values, generated using a selection metric function, that meet a minimum threshold; and (iii) selecting as an output blended graph a candidate blended graph of the plurality of candidate blended graphs having a highest total combination of selection metric values among the plurality of candidate blended graphs.

BRIEF DESCRIPTION OF THE DRAWINGS

FIG. 6 is a diagram depicting a graph ensemble algorithm according to an embodiment of the present invention;

FIG. 7 is table showing benchmark dataset information according to an embodiment of the present invention;

FIG. 8 is a table showing in-distribution model results according to an embodiment of the present invention;

FIG. 9 is a table showing out-of-distribution model results according to an embodiment of the present invention;

FIG. 13 is a table showing results of a graph ensemble algorithm according to an embodiment of the present invention;

FIG. 14 is another table showing results of a graph ensemble algorithm according to an embodiment of the present invention;

FIGS. 15A and 15B are a set of pie-charts depicting pivot-related results of a graph ensemble algorithm according to an embodiment of the present invention;

FIG. 16 is another table showing results of a graph ensemble algorithm according to an embodiment of the present invention;

FIG. 17 is another table showing results of a graph ensemble algorithm according to an embodiment of the present invention; and FIG. 18 is yet another table showing results of a graph ensemble algorithm according to an embodiment of the present invention.

DETAILED DESCRIPTION

Figure 1:
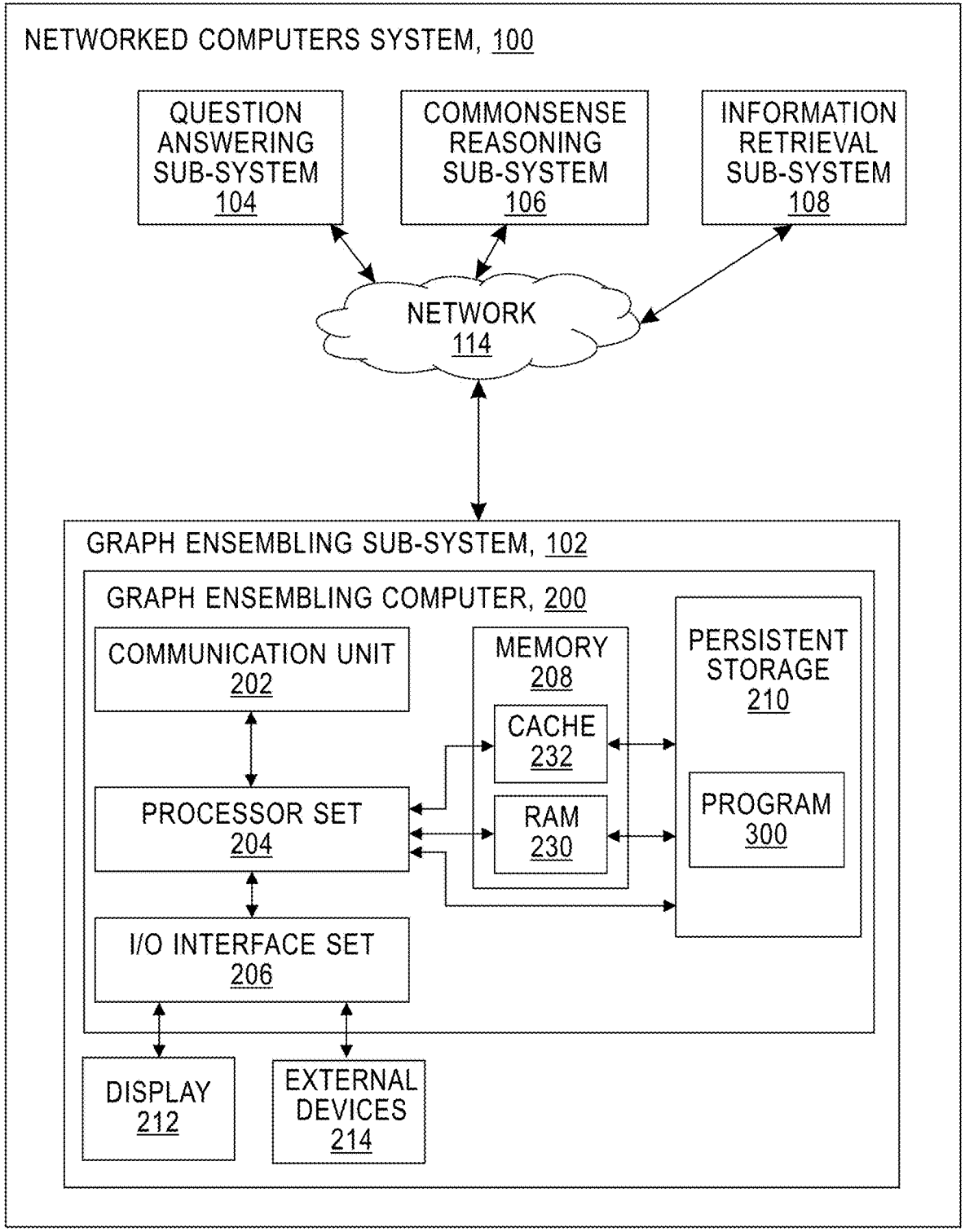
FIG. 1 is a block diagram view of a first embodiment of a system according to the present invention.

In many machine learning tasks, models are trained to predict structure data such as graphs. For example, in natural language processing, it is common to parse texts into dependency trees or abstract meaning representation (AMR) graphs. Ensemble methods combine predictions from multiple models to create one or more new predictions that are more robust and accurate than predictions from individual models. However, while ensembling solutions for classification and regression problems generally exist, there are no such solutions for ensemble graph prediction. Embodiments of the present invention solve this problem, utilizing multiple graph-based parsing models (for example, AMR parsers) to create new, combined (or "blended") graph predictions. In this way, as will be discussed below, embodiments of the present invention provide improved graph predictions that provide various advantages over predictions known in the art.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: graph ensembling sub-system 102; question answering sub-system 104, commonsense reasoning sub-system 106, information retrieval sub-system 108; communication network 114; graph ensembling computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention.

Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
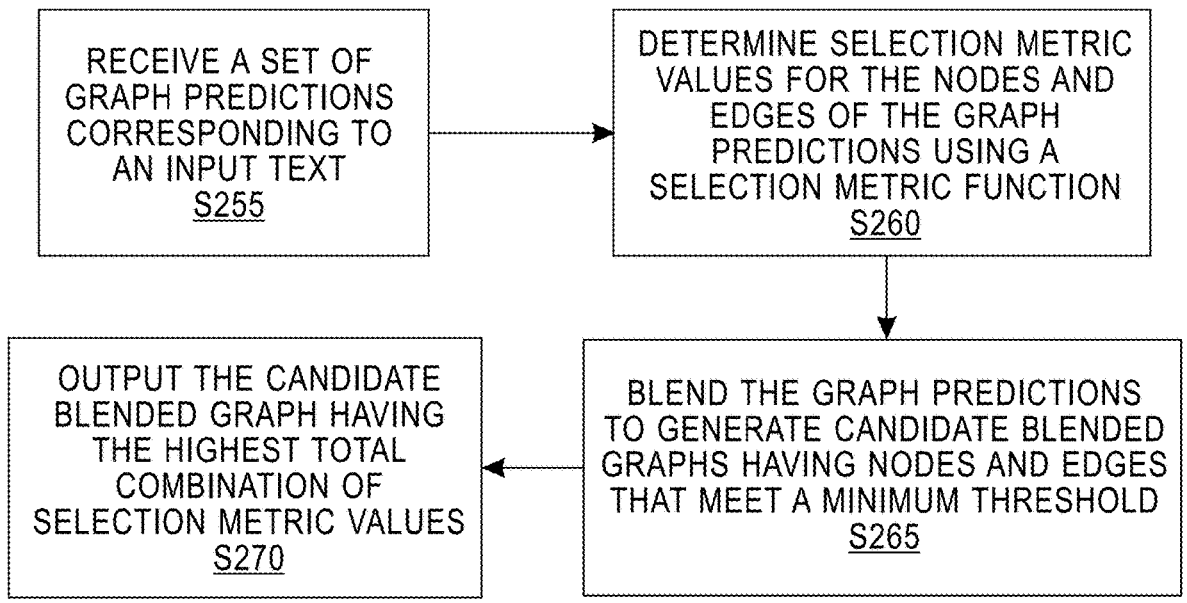
FIG. 2 is a flowchart showing a first embodiment method performed, at least in part, by the first embodiment system.
Figure 3:
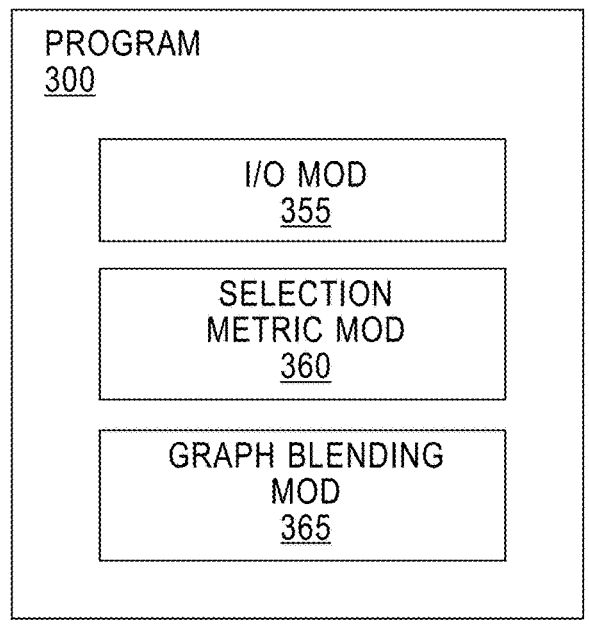
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where I/O module ("mod") 355 (see FIG. 3) receives a set of graph predictions corresponding to an input text. Generally speaking, the graph predictions may be any algorithmically produced graph-type data structures, such as graphs produced by machine learning models (including neural networks such as convolutional neural networks (CNNs), graph neural networks (GNNs), and/or logical neural networks (LNNs)) as output. A graph generally includes a plurality of nodes connected by respective edges, with the nodes and edges often having respective labels. Some common graph-type data structures that can be produced by machine learning models include dependency trees and semantic representations graphs such as abstract meaning representation (AMR) graphs, which are often used in natural language processing-related tasks. However, it should be noted that the various embodiments of the present invention are not limited to these specific types of graph predictions, and that a wide variety of other types of known and yet to be known graph predictions (and the algorithms that produce these predictions) may be used.

In this embodiment, the graph predictions of the set of graph predictions are generated by different respective machine learning models. As will be discussed in further detail below, in the Further Comments and/or Embodiments sub-section of this Detailed Description, by combining results from different models, the benefits of each model can potentially be realized. In some cases, the different models are the same machine learning model but configured differently, and in other cases, the different models are distinctly different models, or a combination of distinctly different models and different configurations of the same model(s). A wide variety of machine learning models may be used, including those now known and those yet to be known in the future. For example, various embodiments of the present invention utilize models that predict graphs representing molecules and/or physical materials, and various embodiments utilize models that predict relationships between groups of people (e.g., in a social network).

It should also be noted that while the present example embodiment, and various other embodiments of the present invention, generally deals with processing an input text for natural language processing purposes, other embodiments of the present invention process other types of input for other meaningful purposes. For example, graph-type data structures are often used for social analysis, fraud detection, traffic prediction, and/or computer vision tasks, and various embodiments of the present invention utilize graph predictions tailored to these tasks, including graph predictions that represent data types other than (or in addition to) text.

It should further be noted that while the present example embodiment receives a set of fully generated graph predictions, other embodiments of the present invention generate the graph predictions themselves, and include the various hardware and/or software components required to perform such generation.

Processing proceeds to operation S260, where selection metric mod 360 (see FIG. 3) determines selection metric values for the nodes and edges of the graph predictions using a selection metric function. Broadly speaking, a selection metric value is a way of indicating an importance of a respective node or edge of particular graph prediction. For example, one way of determining importance according to various embodiments of the present invention is by using a support function. In the present example embodiment, a support function, when applied to a particular node or edge of a graph prediction, determines an amount of support provided to that node or edge by the other graph predictions of the set of graph predictions. In many cases, support simply means that a similar node or edge exists in another graph prediction, such that the more a node or edge is represented in other graph predictions, the higher the selection metric value for that node or edge. Support for a node or edge is also sometimes called a "vote," such that when a first graph prediction supports a node or edge in a second graph prediction, it can be said that the first graph prediction "voted" for the node or edge in the second graph prediction. Additional details regarding support and voting according to various embodiments of the present invention are provided below in the Further Comments and/or Embodiments sub-section of this Detailed Description. It should also be noted that while support and votes are both examples of selection metrics according to various embodiments of the present invention, other types of selection metrics (and methods for calculating selection metrics) may also be used, including Smatch scores, user-inputted scores, and other metrics now known or yet to be known in the future.

In many cases, support for a particular node or edge relates to the respective label for the node or edge. For example, if a particular node is labelled "A," that node is supported by corresponding nodes in other graph predictions that are also labelled "A" but is not supported by corresponding nodes in other graph predictions that are labelled "B." Whether certain nodes and edges in different graph predictions "correspond" to each other can be determined by a matching (or "mapping") function which, generally speaking, matches vertices and edges across graph predictions based on common characteristics (for example, common labels or adjacent edges/nodes). In certain embodiments, for example, the matching function is a bijective matching function that provides an approximation of a maximum matching between respective graphs (for example, utilizing a hill climbing algorithm). Additional details regarding matching/mapping functions according to various embodiments of the present invention are provided below in the Further Comments and/or Embodiments sub-section of this Detailed Description.

Processing proceeds to operation S265, where graph blending mod 365 (see FIG. 3) blends the graph predictions to generate candidate blended graphs having nodes and edges that meet a minimum selection metric threshold. In the present example embodiment, blending the graph predictions includes creating a candidate blended graph (also referred to as an "ensemble graph") for each graph prediction by modifying the graph prediction based on comparisons to the other graph predictions. More specifically, in this embodiment, blending the graph predictions includes first selecting a graph prediction as a pivot graph, identifying the respective selection metric values for the nodes and edges of the pivot graph (determined in operation S260, described above), and modifying the pivot graph based, at least in part, on the selection metric values for the nodes and edges of the pivot graph, yielding a candidate blended graph. The process is then repeated for each graph prediction until each graph prediction has a respective candidate blended graph. Additional details regarding blending algorithms (also referred to as "graph ensemble" or "Graphene" algorithms") according to various embodiments of the present invention are provided below in the Further Comments and/or Embodiments sub-section of this Detailed Description.

In many cases, modifying the pivot graph is based, at least in part, on the minimum selection metric threshold mentioned above. The minimum selection metric threshold (such as "support threshold θ," discussed below) generally indicates a minimum selection metric value for nodes and edges of the graph. For example, if the minimum selection metric threshold is "2," and the selection metric value for a particular node is "1," then the node fails to meet the minimum selection metric threshold and cannot be included in a candidate blended graph. This discrepancy can be addressed by performing a modification operation on the pivot graph.

Modifying the pivot graph can include one or more of several possible modification operations. For example, in some cases, modifying the pivot graph includes removing from the pivot graph a node or edge that does not meet the minimum selection metric threshold. In other cases, modifying the pivot graph includes adding to the pivot graph a node or edge that meets the minimum selection metric threshold from one of the other graph predictions (for example, to replace a removed node or edge). In still other cases, modifying the pivot graph includes modifying a label of a node or edge of the pivot graph based, at least in part, on the selection metric value for the node or edge of the pivot graph and on a selection metric value for a node or edge of a graph prediction of the other graph predictions (for example, replacing the label of a node or edge with a label having the highest support based on the majority vote rule). Of course, these examples are not meant to be limiting, and a wide variety of known and yet to be known modifications may be performed on the pivot graph to create the candidate blended graph. Additional details regarding pivot graphs and corresponding modifications according to various embodiments of the present invention are provided below in the Further Comments and/or Embodiments sub-section of this Detailed Description.

Processing proceeds to operation S270, where I/O mod 355 (see FIG. 3) outputs the candidate blended graph having the highest total combination of selection metric values (also referred to as the "output blended graph"). In the present example embodiment, the "total combination of selection metric values" for a respective graph prediction/candidate blended graph is simply the sum of all selection metric values for all of the nodes and edges of the graph prediction/ candidate blended graph. However, in other embodiments, including embodiments discussed below in the Further Comments and/or Embodiments sub-section, other methods for calculating total support may be used.

The output blended graph can be used in a variety of practical applications, depending on the original input text, the utilized machine models, and the underlying tasks being performed by networked computers system 100. For example, AMR graphs are often used in information extraction, question answering, natural language understanding, commonsense reasoning, and other information retrieval tasks, and as such various embodiments that utilize AMR graph predictions output the output blended graph to sub-systems that perform those tasks. The present example embodiment, for example, outputs the output blended graph to question answering sub-system 104, commonsense reasoning sub-system 106, and information retrieval sub-system 108 (see FIG. 1). In various other embodiments, the output blended graph may be outputted to sub-systems for analyzing molecules, physical materials, and/or relationships between groups of people, and/or other sub-systems now known or yet to be known in the future.

III. Further Comments and/or Embodiments

Various embodiments of the present invention provide a system and method that take, as input, a fragment of natural language text (an "input text"), a set of graph predictions (e.g., AMR graphs or dependency trees) of the input text from different machine learning models, a minimum support threshold, and a support function. In various embodiments, the system blends the graph predictions to output a blended graph that is most supported (voted) by the majority of the graphs in the input, where all the nodes and edges in the blended graph must have support greater than the minimum support threshold.

In various embodiments, the system further includes a method that receives input as a set of graphs and constructs the graph that is most supported (voted) by the input graphs by: (i) choosing each input graph as a pivot graph; (ii) comparing the pivot graph to every input graph and using the support function to update a support value for every node and edge in the pivot graph; (iii) modifying the pivot graph by removing low-supported edges and nodes (lower than the input support threshold) and adding high-support edges or nodes, or re-labelling nodes or edges with high-supported labels; and/or (iv) comparing all the modified pivot graphs and choosing the one with the highest total support as the final blended graph output.

In various embodiments, the system further includes a support function that takes input as a pair of graphs and outputs the support values for each node and edge in the input graphs, for example, by approximating the maximum matching between the graphs and increasing the support of matched nodes or edges.

Various embodiments of the present invention recognize that while ensembling techniques have been proposed for classification or regression problems, ensemble graph prediction (that is, ensembling techniques for graph predictions) has not been studied thoroughly. In various embodiments, this problem is formalized as mining the largest graph that is the most supported by a collection of graph predictions. As the problem is NP-Hard, various embodiments utilize an efficient heuristic algorithm to approximate the optimal solution. To validate the approach, various embodiments carry out experiments in AMR parsing problems, where the experimental results demonstrate that the approach can combine the strength of state-of-the-art AMR parsers to create new predictions that are more accurate than any individual models in five standard benchmark datasets.

Various embodiments of the present invention recognize that ensemble learning is a popular machine learning practice in which predictions from multiple models are blended to create a new prediction that is usually more robust and accurate. In fact, some ensemble methods have been the winning solution in various machine learning and data science competitions. A key reason behind the successes of ensemble methods is that ensemble methods can combine the strength of different models to reduce the variance and bias in the final prediction. Research in ensemble methods mostly focuses on regression or classification problems.

Figure 4:
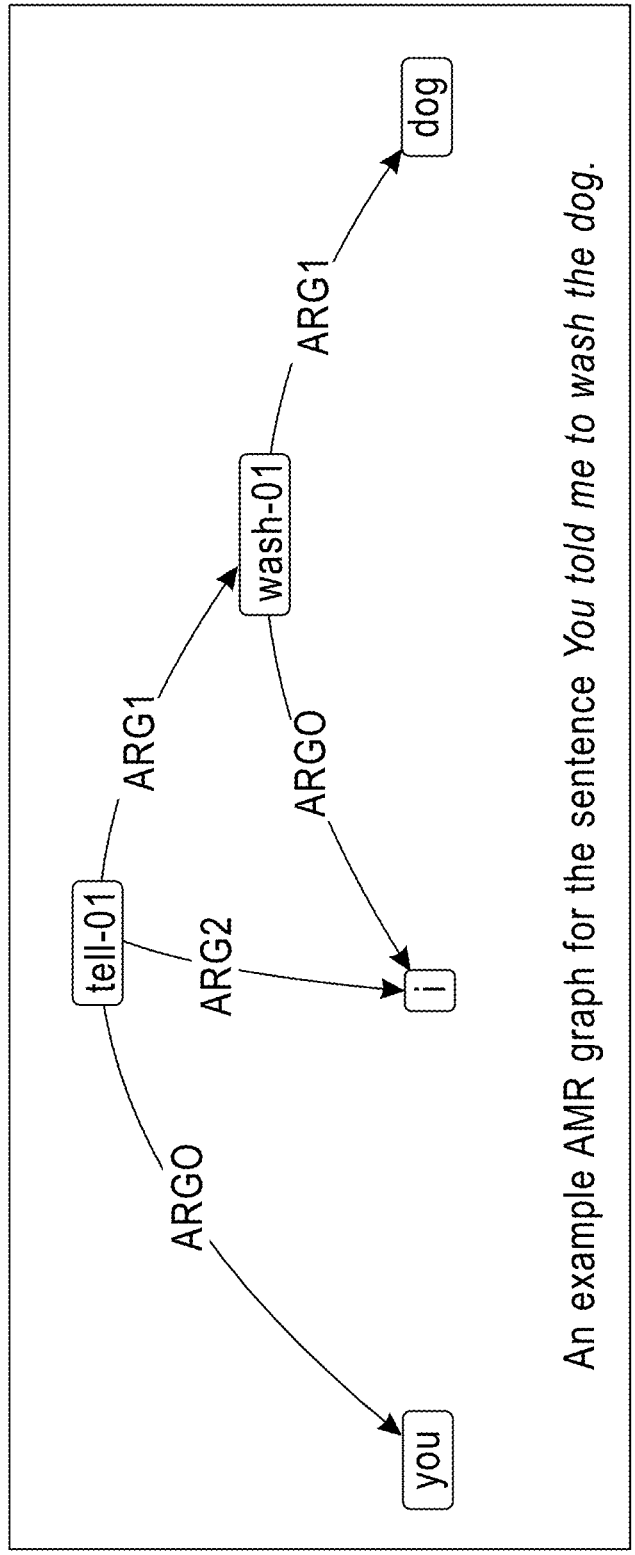
FIG. 4 is a diagram depicting AMR graph parsing according to an embodiment of the present invention.

Various embodiments of the present invention also recognize that many recent machine learning tasks provide prediction outputs in the form of graphs. For example, in Abstract Meaning Representation (AMR) parsing, the input is a fragment of text and the output is a rooted, labeled, directed, acyclic graph (DAG). The parsing abstracts away from syntactic representations, in the sense that sentences with similar meaning generally have the same AMR. For example, FIG. 4 includes AMR graph 400 depicting the sentence "You told me to wash the dog," where nodes are concepts and edges are relations between the concepts. For example, as shown in FIG. 4: (i) "you" is the subject of the verb "tell," and that relation between the node labelled "you" and the node labelled "tell-01" is represented as ARG0, (ii) "I" is the object of the verb "tell," and that relation between the node labelled "tell-01" and the node labelled "I" is represented as ARG2.

Various embodiments of the present invention recognize that AMR parsing is an important problem in natural language processing (NLP) research and has a broad application in downstream tasks such as question answering and commonsense reasoning. Recent approaches for AMR parsing leverage the advances from pretrained language models and numerous deep neural network architectures.

Various embodiments of the present invention recognize that, unlike methods for ensembling numerical or categorical values for regression or classification problems, where the mean value or majority votes are used, respectively, the problem of graph ensemble is more complicated. For example, FIG. 5 includes diagram 500 showing three graphs ($g_1$, $g_2$, $g_3$) with different structures, having varied number of edges and vertices with different labels.

Various embodiments of the present invention formulate an ensemble graph prediction as a graph mining problem that looks for the largest common structure among the graph predictions. In general, finding the largest common subgraph is a well-known computationally intractable problem in graph theory. However, for AMR parsing problems where the AMR graphs have labels and a simple tree-alike structure, various embodiments of the present invention provide an efficient heuristic algorithm (referred to as a "graph ensemble" algorithm, or "Graphene" algorithm) to approximate the solution of the given problem well.

In various embodiments, the Graphene algorithm is generally based on the strategy of "please correct me if I am wrong!" The algorithm receives, as input, a set of graphs, and produces, as output, a blended graph that is most similar to a majority of the input graphs. The general operations of the algorithm include: (i) an input graph is chosen as a pivot graph, and the algorithm casts votes from other graphs to correct the pivot graph; (ii) the given pivot graph is compared against each graph in the set of the input graphs to find the maximum common subgraph between them; (iii) for each matching edge and node in the maximum common subgraph, supports or votes are increased respectively; (iv) once the pivot graph has been compared against all input graphs and the voting statistics are available, the pivot graph is modified as follows: accumulated supports for edges and nodes are used to filter out the ones with low-supports (lower than a user-defined threshold), edges and nodes with high-supports are added to the pivot graph, and labels of nodes or edges are optionally changed to the most voted labels based on the majority voting rule (or another rule); (v) the algorithm repeats the previous operations when each input graph is chosen as a pivot graph; (vi) finally, the algorithm chooses among the modified pivot graphs the one with the largest total support as the final blended one.

To validate this approach, various embodiments of the present invention collect the predictions from four state-of-the-art AMR parsers and create new predictions using the graph ensemble algorithm. In various embodiments, the chosen AMR parsers are recent, state-of-the-art AMR parsers such as a seq2seq-based method using BART, a transition-based approach, and a graph-based approach. In addition to those models, various embodiments also train a new seq2seq model based on T5 to leverage the strength of this pretrained language model.

The experimental results produced by various embodiments of the present invention show that in all five standard benchmark datasets, the graph ensemble approach outperforms the previous state-of-the-art models and achieves new state-of-the-art results. For example, the graph ensemble approach achieves new state-of-the-art results with 1.7, 1.5, and 1.3 points better than existing approaches in BIO (under out-of-distribution evaluation), AMR 2.0, and AMR 3.0 datasets, respectively. This result demonstrates the strength of the ensemble method in leveraging the model diversity to achieve better performance. An interesting property of the graph ensemble solution in various embodiments is that the solution is model-agnostic, and therefore can be used to make an ensemble of existing model predictions without the requirement to have access to model training.

III.A. Problem Formation

The following paragraphs describe examples and a set of terminology that are utilized in describing graph ensemble algorithms according to various embodiments of the present invention.

As used herein, $g=(E, V)$ denotes a graph with the set of edges E and the set of vertices V. Each vertex $v \in V$ and edge $e \in E$ is associated with a label denoted as $l(v)$ and $l(e)$, respectively, where $l(\cdot)$ is a labelling function. Given two graphs $g_1=(E_1, V_1)$ and $g_2=(E_2, V_2)$, a vertex matching $\phi$ is a bijective function that maps a vertex $v \in V_1$ to a vertex $\phi(v) \in V_2$.

Figure 5:
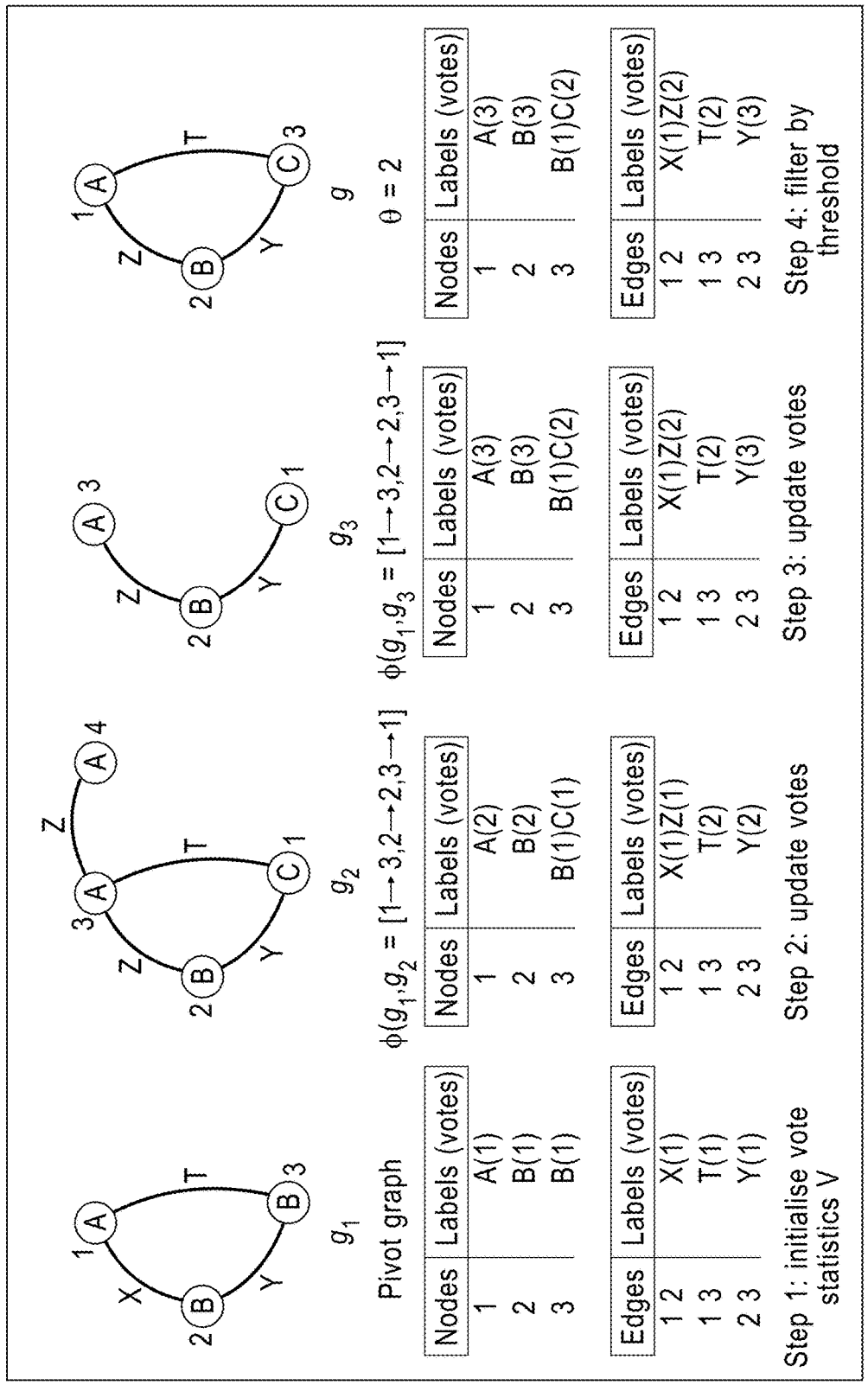
FIG. 5 is a diagram depicting graphs according to an embodiment of the present invention.

Example 1. In FIG. 5, between $g_1$ and $g_2$ there are many possible vertex matches, where $\phi(g_1, g_2)=[1 \rightarrow 3, 2 \rightarrow 2, 3 \rightarrow 1]$ is one of them, which can be read as the first vertex of $g_1$ being mapped to the third vertex of $g_2$, and so forth. Note that not all vertices $v \in V_1$ have a match in $V_2$ and vice versa. For example, the fourth vertex in $g_2$ does not have a matched vertex in $g_1$.

Given two graphs $g_1$ and $g_2$ and a vertex match $\phi(g_1, g_2)$, support of a vertex v with respect to the matching $\phi$, denoted as $s_\phi(v)$, is equal to 1 if $l(v)=l(\phi(v))$ and 0 otherwise. Given an edge $e=(v_1, v_2)$ the support of e with respect to the vertex match $\phi$, denoted as $s_\phi(e)$ is equal to 1 if $l(e)=l((\phi(v_1), \phi(v_2)))$ and 0 otherwise.

Example 2. In FIG. 5, for the vertex match $\phi(g_1, g_2)=[1 \rightarrow 3, 2 \rightarrow 2, 3 \rightarrow 1]$, the first vertex in $g_1$ and the third vertex in $g_2$ share the same label A, therefore the support of the given vertex is equal to 1. On the other hand, the third vertex in $g_1$ and the first vertex in $g_2$ do not have the same label so their support is equal to 0.

Between two graphs, there are many possible vertex matches, where the best vertex match is defined as the one that has the maximal total vertex support and edge support. As described below, a "vertex match" refers to the best vertex match unless indicated otherwise.

$G=\{g_1=(E_1, V_1), g_2=(E_2, V_2), \ldots, g_m=(E_m, V_m)\}$ is denoted as a set of m graphs. Given any graph $g=(E, V)$, for every $g_i$, $\phi_i(g, g_i)$ is the best vertex match between g and $g_i$. The total support of a vertex $v \in V$ or an edge $e \in E$ is defined as follows:

$$\text{support } (e) = \sum_{i=1}^{m} s_{\phi_i}(e)$$

$$\text{support } (v) = \sum_{i=1}^{m} s_{\phi_i}(v)$$

Given a support threshold $\theta$, a graph g is called $\theta$-supported by G if for any node $v \in V$ or any edge $e \in E$, $\text{support}(v) \geq \theta$ and $\text{support}(e) \geq \theta$.

Example 3. In FIG. 5, graph g is $\theta$-supported by $G=\{g_1, g_2, g_3\}$ where $\theta=2$.

Intuitively, an ensemble graph g should have as many common edges and vertices with all the graph predictions as possible. Therefore, we define the graph ensemble problem as follows:

Problem 1 (Graph Ensemble). Given a support threshold θ and a collection of graphs G, find the graph g that is θ-supported by G and has the largest sum of vertex and edge supports.

Theorem 1. Finding the optimal θ-supported graph with the largest total of support is NP-Hard.

Proof. NP-Hardness is proved by reduction to the Maximum Common Edge Subgraph (MCES) problem, which is known to be an NP-Complete problem. Given two graphs $g_1$ and $g_2$, the MCES problem finds a graph g that is a common subgraph of $g_1$ and $g_2$ and the number of edges in g is the largest. Consider the following instance of the Graph Ensemble problem with θ=2, and G={$g_1$, $g_2$} created from the graphs in the MCES problem. Assume that all vertices and all edges of $g_1$ and $g_2$ have the same label A.

Because θ=2, a θ-supported graph is also a common subgraph between $g_1$ and $g_2$ and vice versa. $g_s$ and $g_e$ are denoted as the common subgraph between $g_1$ and $g_2$ with the largest support and the largest common edge, respectively. It can be shown that $g_s$ has as many edges as $g_e$. In fact, because $g_s$ is the largest supported common subgraph, there is no vertex $v \in g_e$ such that $v \notin g_e$ because otherwise v can be added to $g_s$ to create a larger supported graph. For any edge e=($v_1$, $v_2$)∈$g_e$, because both vertices $v_1$ and $v_2$ also appear in $g_s$, the edge e=($v_1$, $v_2$) must also be part of $g_s$, otherwise this edge can be added to $g_s$ to create a subgraph with a larger support. Therefore, $g_s$ has as many edges as $g_e$, which is also a solution to the MCES problem.

III.B. Graph Ensemble Algorithm

The following paragraphs describe details pertaining to graph ensemble algorithms according to various embodiments of the present invention. In these paragraphs, a graph ensemble algorithm sets out to solve Problem 1, described above, based on the strategy "Please correct me if I am wrong!"

One way to describe the graph ensemble algorithm discussed in these paragraphs is that it improves a pivot graph based on other graphs. More specifically, starting with a pivot graph $g_i$ (i=1, 2, ..., m), votes are collected from the other graphs at every existing vertex and existing/non-existing edges to correct $g_i$. Pseudo-code steps of the algorithm are provided in algorithm 600 of FIG. 6.

In FIG. 6, the function "getVote(•)" updates voting statistics for edges and nodes while the function "Filter(•)" removes edges and nodes with low-support and adds high-support edges and nodes and/or changes edge and node labels using voting rules (for example, majority voting rules).

Applying algorithm 600 to the graphs of FIG. 5, algorithm 600 starts with the first graph $g_1$ and considers it as a pivot graph $g_{pivot}$. In the first operation, algorithm 600 creates a table to keep voting statistics V initialized with the vote counts for every existing vertex and edge in $g_{pivot}$.

To draw additional votes from the other graphs, algorithm 600 then performs the following operations:

Call the function ϕ($g_1$, $g_2$) (i=2, 3, ..., m) to get the best bijective mapping ϕ between the vertices of two graphs $g_1$ and $g_i$ (note, the index i is dropped from $ϕ_i$ here because $g_i$ and $g_{pivot}$ are given in context). For example, the best vertex match between $g_1$ and $g_2$ is ϕ=1→3, 2→2, 3→1 because that vertex match has the largest number of common labeled edges and vertices (see FIG. 5).

Enumerate the matching vertices and edges to update the voting statistics accordingly. For example, because the vertex 3 in $g_1$ with label B is mapped to the vertex 1 in $g_2$ with label C, a new candidate label C is added to the table for the given vertex. For the same reason, a new candidate label Z is added to the table for the edge (1, 2). For all the other edges and vertices where the labels are matched the votes are updated accordingly (see FIG. 5).

Once the complete voting statistics V are available, algorithm 600 filters the candidate labels of edges and vertices using the provided support threshold θ by calling the function Filter(V, θ) to obtain an ensemble graph $g_i^e$. For special cases, when disconnected graphs are not considered as a valid output, all edges of the pivot graph are kept even if support is below the threshold. On the other hand, for the graph prediction problem, where a graph is only considered a valid graph if it does not have multiple edges between two vertices and multiple labels for any vertex, all candidate labels are removed for vertices and edges except the candidate label with the highest number of votes.

Assume that the resulting ensemble graph that is created by using $g_i$ as the pivot graph is denoted as $g_i^e$. The final ensemble graph $g^e$ is chosen among the set of graphs $g_1^e$, $g_2^e$, ..., $g_m^e$ as the one with the largest total support.

Recall that $ϕ(g_{pivot}, g_i)$ finds the best vertex match between two graphs. In general, the given task is computationally intractable. However, for labeled graphs AMR heuristics (such as the Cai&Knight heuristic, described below) have been proposed to approximate the best match by a hill-climbing algorithm. A heuristic may start with the candidate with labels that are mostly matched. The initial match is then modified iteratively to optimize the total number of matches with a predefined number of iterations (default value set to 5). This algorithm can be used herein to approximate $ϕ(g_{pivot}, g_i)$.

III.C. Experiments

The following paragraphs describe experiments that were conducted to compare graph ensemble (Graphene) algorithms of various embodiments of the present invention with other models using different benchmark settings. These experiments are described herein for example purposes and relate to certain embodiments of the present invention, and as such are not intended to be limiting of all embodiments.

Experimental Settings—Model Settings

SPRING. The SPRING model tackles Text-to-AMR and AMR-to-Text as a symmetric transduction task. The experiments described herein utilized pretrained SPRING models as well as three additional models trained using different random seeds. Blink was used to add wiki tags to the predicted AMR graphs as a post-processing step.

T5. The T5 model includes a unified framework that models a wide range of NLP tasks as a text-to-text problem. The experiments described herein trained a model to transfer a text to a linearized AMR graph based on T5-large. The data was preprocessed by linearization and by removing wiki tags using an AMR-based script. In addition, the experiments described herein added a new task that took as input a sentence and predicted the concatenation of word senses and arguments provided in the EnglishWeb Treebank dataset. The model was trained with 30 epochs, and employed an ADAM optimization with a learning rate of 1e-4 and a mini-batch size of four. Blink was used to add wiki tags to the predicted AMR graphs during post-processing.

APT. APT is a transition-based AMR parser based on Transformer. APT combines hard-attentions over sentences with a target side action pointer mechanism to decouple source tokens from node representations. For model training, the experiments added 70K model-annotated silver data sentences to the training data.

Cai&Lam. The Cai&Lam algorithm treats AMR parsing as a series of dual decisions (i.e., which parts of the sequence to abstract, and where in the graph to construct) on the input sequence and constructs the AMR graph incrementally. Following this approach, the experiments described herein: used Stanford CoreNLP4 for tokenization, lemmatization, part-of-speech tagging, and named entity recognition; applied a pretrained model to all testing datasets; and followed the same pre-processing and post-processing steps for graph re-categorization.

Graphene (the graph ensemble algorithm). The only hyperparameter of the Graphene algorithm in this embodiment is the threshold θ. One practice for ensemble methods via voting strategy is to consider the labels that get at least 50% of the total number of votes. As such, the experiments described herein set the threshold θ such that $$\frac{\theta}{m} \geq 5$$

(where M is the number of models in the ensemble). In various aspects of the present experiments, a dedicated GPU was utilized for model training, and eight individual CPUs were used for making an ensemble.

Experimental Settings—Evaluation

In some cases, the present experiments calculated a Smatch score, where the Smatch score is a metric for measuring the similarity between the predictions and gold AMR graphs. The overall Smatch score can be broken down into different dimensions, including the followings sub-metrics:

Unlabeled (Unl.): Smatch score after removing all edge labels

No WSD (NWSD): Smatch score while ignoring Propbank senses

NE: F-score on the named entity recognition (:name roles)

Wikification (Wiki.): F-score on the wikification (:wiki roles)

Negations (Neg.): F-score on the negation detection (:polarity roles)

Concepts (Con.): F-score on the concept identification task

Reentrancy (Reen.): Smatch computed on reentrant edges only

SRL: Smatch computed on :ARG-i roles only

Experimental Settings—Datasets

In some cases, the present experiments utilized five standard benchmark datasets to evaluate the approaches of the graph ensemble algorithms of various embodiments of the present invention and of the other models. FIG. 7 includes table 700 showing statistics for those datasets. As shown in table 700, the benchmark datasets utilized were AMR 2.0, AMR 3.0, BIO, Little Prince (LP), and New3. In the example shown in table 700, AMR 2.0 and AMR 3.0 were divided into train, development and testing sets, and were used for in-distribution evaluation as discussed below. The models trained on AMR 2.0 training data were used to evaluate out-of-distribution prediction on the BIO, the LP, and the New3 dataset, as also discussed below.

In-Distribution Evaluation

In some cases, the present experiments evaluated the approaches of the graph ensemble algorithm of various embodiments of the present invention and of the other models using training and test data belonging to the same domain. These evaluations are generally referred to as "in-distribution" or performed under "in-distribution settings."

FIG. 8 includes table 800 showing the in-distribution results of the different models on a test split of the AMR 2.0 and AMR 3.0 datasets. In table 800, the metrics reported for SPRING correspond to the model with the highest Smatch score among the four models (the checkpoint plus the three models with different random seeds).

For the graph ensemble approach, two sets of results are shown: (i) results when Graphene is an ensemble of four SPRING checkpoints, denoted as Graphene 4S, and (ii) results when Graphene is an ensemble of all the models including the four SPRING checkpoints, APT, T5, and Cai&Lam, denoted as Graphene All. For the AMR 3.0 dataset, the Cai&Lam model was not available so the reported result corresponds to an ensemble of the six other models (four SPRING checkpoints, APT, and T5).

As shown in FIG. 8, Graphene successfully leveraged the strength of all the models and provided better prediction both in terms of the overall Smatch score and sub-metrics. Both datasets produced state-of-the-art results, with performance gain of 1.6 and 1.2 Smatch points in AMR 2.0 and AMR 3.0, respectively. As shown in table 800, by combining predictions from four checkpoints of the SPRING model, Graphene 4S provided better results than any individual model. The result was improved further when increasing the number of ensemble models, as Graphene All improved upon Graphene 4S and outperformed the individual models in terms of the overall Smatch score.

Out-of-Distribution Evaluation

In some cases, the present experiments evaluated the approaches of the graph ensemble algorithm of various embodiments of the present invention and of the other models using AMR 2.0 training data to collect AMR predictions for testing datasets in domains that differed from the AMR 2.0 dataset. These evaluations are generally referred to as "out-of-distribution" or performed under "out-of-distribution settings."

FIG. 9 includes table 900 showing the out-of-distribution results. Similar to the in-distribution experiments, the Graphene 4S algorithm achieved better results than other individual models, while the Graphene All approach improved the given results further. As shown, these benchmark datasets achieved new state-of-the-art results under out-of-distribution settings.

This result has an important practical implication because in practice it is very common not to have labeled AMR data for domain-specific texts, as the labeling task can be very time-demanding. Using the proposed ensemble methods achieved better results with domain-specific data not included in the training sets.

How the Ensemble Algorithm Works

The following examples and experimental data provide support for why graph ensemble methods of various embodiments of the present invention improve over existing methods.

Figure 10:
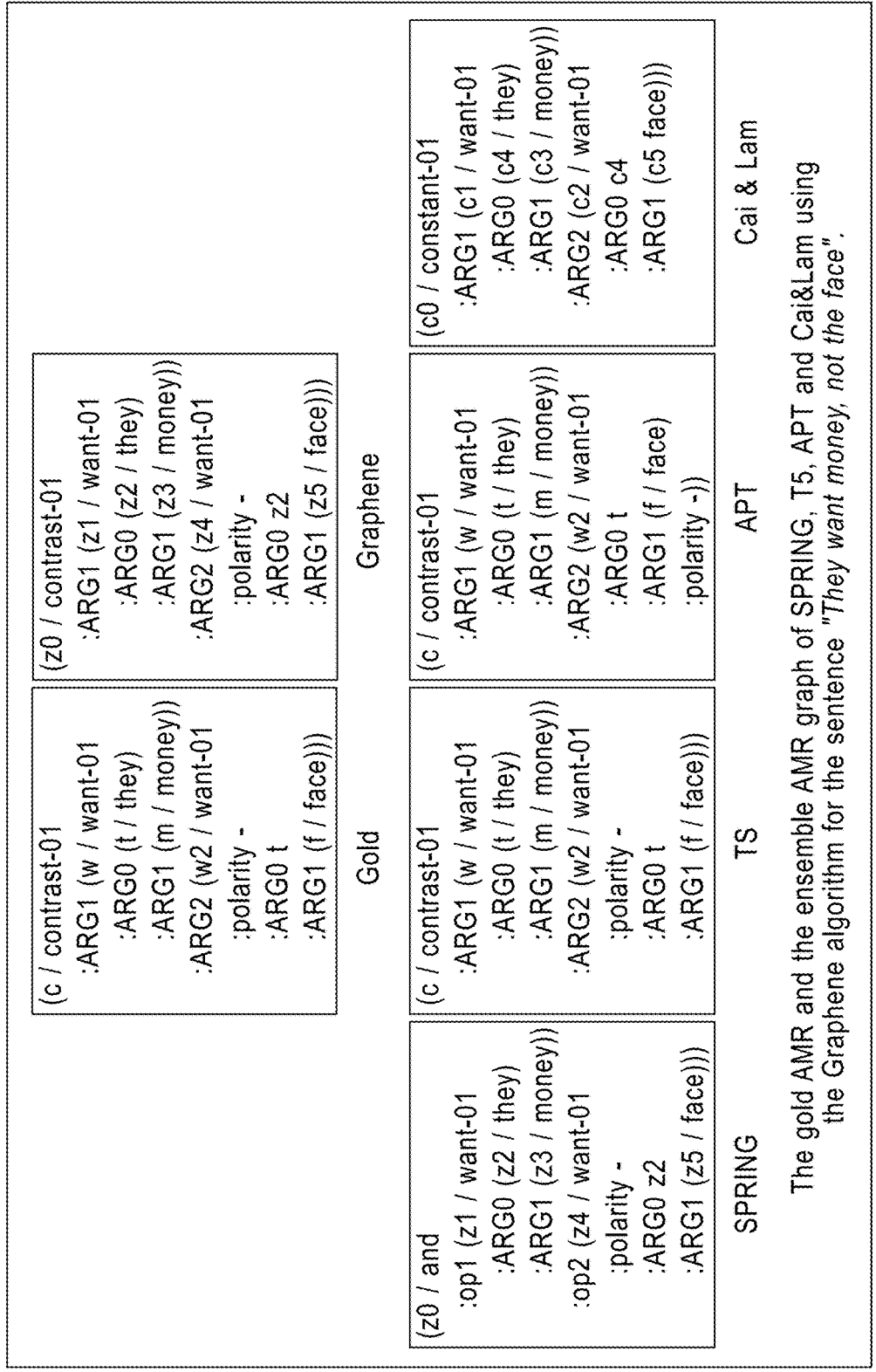
FIG. 10 is a diagram depicting AMR graph predictions according to an embodiment of the present invention.

FIG. 10 includes diagram 1000 depicting an input sentence with a Gold AMR in Penman format and a list of AMRs corresponding to the predictions of SPRING, T5, APT, Cai&Lam, and the ensemble graph given by Graphene. In this particular example, with the sentence "They want money, not the face," the AMR prediction from SPRING was inaccurate. Graphene corrected the prediction thanks to the votes given from the other models. In particular, the label and of the root node $z_0$ of SPRING prediction was corrected to contrast—01 because T5, APT and Cai&Lam parsers all voted for contrast—01. On the other hand, the labels :op1 and :op2 of the edges ($z_0$; $z_1$) and ($z_0$; $z_4$) were modified to have the correct labels :ARG1 and :ARG2 accordingly due to the votes from the other models. In the example shown in FIG. 10, even though the Cai&Lam method missed polarity prediction, because the other models predicted polarity correctly, the ensemble prediction did not inherit this mistake. Putting everything together, the prediction from Graphene perfectly matched with the gold AMR graph in this example.

Figures 11, 12:
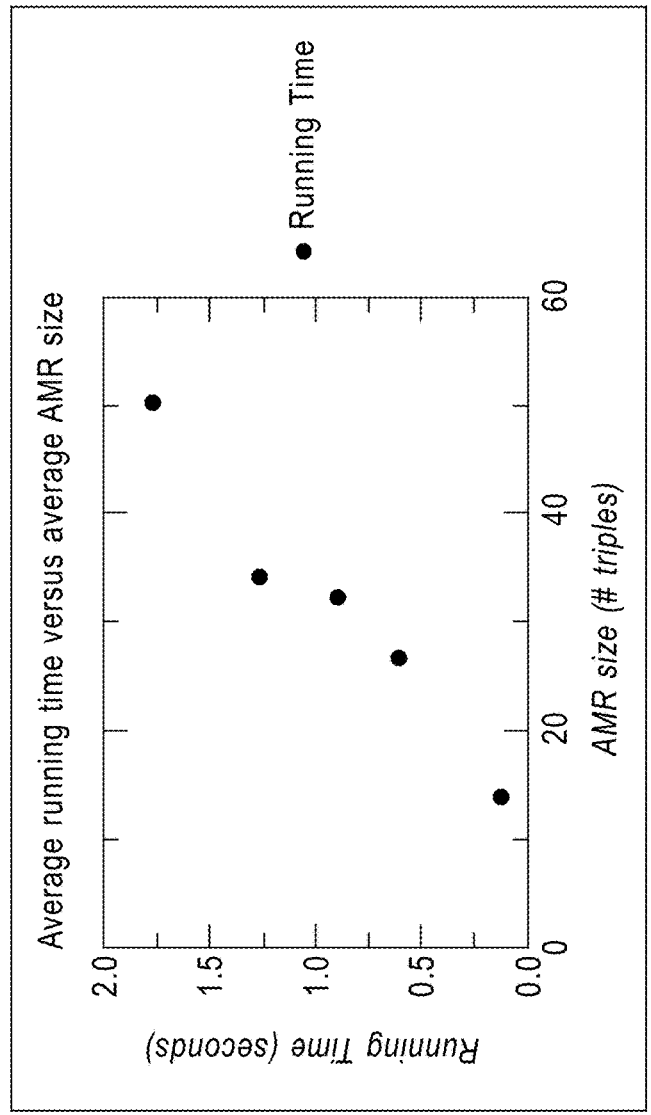
FIG. 11 is a table showing support and Smatch scores according to an embodiment of the present invention.
FIG. 12 is a graph depicting results of a graph ensemble algorithm according to an embodiment of the present invention.

As described above, in many embodiments the Graphene algorithm searches for the graph that has the largest support from all individual graphs. One question that arises from this is whether the support is correlated with the accuracy of AMR parsing. FIG. 11 includes table 1100 showing the support and the Smatch score derived from three models in the standard benchmark datasets. The first model was SPRING, while the second one denoted as Graphene SPRING pivot started with a SPRING prediction as a pivot and corrected the prediction using votes from other models. The last model corresponded to the Graphene algorithm that polled the votes while considering every prediction as a pivot for correction and selected the best one. Since Graphene looked for the best pivot to have better-supported ensemble graphs, the total supports of the Graphene predictions were larger than the Graphene SPRING pivot predictions.

Table 1100 also shows that total support was highly correlated to the Smatch score. As shown, Graphene had higher support in all the benchmark datasets and a higher Smatch score than Graphene SPRING pivot. This experiment suggests that by optimizing the total support, ensemble graphs with higher Smatch scores can be obtained.

Other Work

Ensemble structure prediction. Previous studies have explored various ensemble learning approaches for dependency and constituent parsing. For example, some propose taking the output from different parsers and maximizing the number of votes for a well-formed dependency or constituent structure. Others use minimum Bayes risk inference to build a consensus dependency parser from an ensemble of independently trained greedy LSTM transition-based parsers with different random initializations. Note that a syntactic tree is a special graph structure in which nodes for a sentence from different parsers are roughly the same. In contrast, various embodiments of the present invention provide an approach to ensemble graph predictions in which both graph nodes and edges can be different among base predictions.

Ensemble methods for AMR parsing. Parsing text to AMR is an important research problem. Existing approaches in AMR parsing are divided into three categories. Sequence to sequence Models consider the AMR parsing as a machine translation problem that translates texts to AMR graphs. Transition-based methods predict a sequence of actions given the input text, and then the action sequence is turned into an AMR graph using an oracle decoder. Lastly, graph-based methods directly construct the AMR graphs from textual data. All these methods are complementary to each other and thus ensemble methods can leverage the strength of these methods to create a better prediction, as demonstrated herein.

Ensemble of AMR predictions from a single type of model has also been studied, and it has been demonstrated that by combining predictions from three different model checkpoints a performance improvement in the final prediction may be gained. However, ensemble in sequential decoding requires that all predictions are from the same type of models. It is not applicable for cases when the predictions are from different types of models such as seq2seq, transition-based, or graph-based models. In contrast, the graph ensemble algorithms of various embodiments of the present invention are model-agnostic—that is, they can combine predictions from different models. As shown above, the combining of predictions from different models has demonstrated benefits, with additional gains in performance compared to the ensemble of predictions from a single model's checkpoints.

III.D. Additional Comments Regarding Experiments

The following paragraphs provide additional details and data regarding experiments involving Graphene algorithms of various embodiments of the present invention. As mentioned above, these experiments are described herein for example purposes and relate to certain embodiments of the present invention, and as such are not intended to be limiting of all embodiments.

Running Time

FIG. 12 depicts graph 1200 showing the average running time of the Graphene algorithm in various experiments. The horizontal axis corresponds to the average graph size (the number of triples) while the vertical axis shows the average running time (in seconds). As shown, the running time depended on the average size of the AMR graphs. AMR graph size was generally proportional to the input sentence length, with the largest average graph having around 50 triples. In these experiments, Graphene required less than two seconds on an 8-core CPU machine to make an ensemble from seven models.

Support Threshold

The popular VotingClassifier algorithm implemented in scikit-learn follows the majority vote rule, where the label with the most votes is selected as the final prediction. The same rule was applied in various experimental settings described herein, where setting θ=0.5 is comparable to the majority vote rule in classification problems.

If there is an independent validation set, this hyper-parameter can be tuned to choose the right theta value for that dataset. For example, in the AMR 2.0 dataset, the results of ensembling four Spring models, the APT model, and the T5 model on the validation set (the dev split) when θ was varied are reported in table 1300 of FIG. 13. Based on these results on an independent dev set, θ=0.5 is the right choice for AMR 2.0 in this case. Note that setting θ is a trade-off between precision and recall.

Comparison with Median Baselines

The results of the following additional baseline approaches are shown in table 1400 of FIG. 14:

Uniform sampling: for each set of predictions the graph was uniformly sampled at random, which produced a substantially "median" representative from a set.

Ideal median: assumed that the gold AMRs were available for the test set (hence named as "ideal"). The Smatch of each prediction was computed with the gold AMR and the AMR with the median Smatch score was used as the final prediction.

Pivot Selection

FIGS. 15A and 15B depict pie-charts 1500a and 1500b showing percentages of the number of times that each model was selected as the best pivot in the Graphene algorithm. Note that the order of the algorithms matters because when tight happens, the ensemble is chosen from the first algorithm in the list.

The results in FIGS. 15A and 15B show that all algorithms contributed to the final predictions. In the Bio dataset where the test data was from a specific domain that differed from the training data domain, Graphene benefited from the model diversity when it leveraged predictions from all models effectively.

Robustness on Down-Sampled Training Data

In some cases, the experiments down-sampled the AMR 2.0 training data with sample rates 0.6 and 0.8. Then, four Spring models with different random seeds and the T5 model were trained on these two sample sets. The Smatch score on AMR 2.0 test sets and on the out-of-distribution sets (LP, New3, Bio) are shown in table 1600 of FIG. 16.

As shown, compared to the best individual models, Graphene was more robust and 1.35, 2.86, 0.92, and 0.83 points better when the sample rate was equal to 0.6. While compared to the best individual models, Graphene was more robust and 1.27, 2.73, 1.27 and 0.39 points better when the sample rate was equal to 0.8. This result demonstrates that the methods of various embodiments of the present invention are robust with respect to smaller training data.

Tie Breaking

In many cases, when multiple ensemble graphs have the same support, Graphene chooses the ensemble graph created when the first model in the list is chosen as the pivot. Table 1700 of FIG. 17 shows the results when each model was put first in the list. With a validation set such as with AMR 2.0 or AMR 3.0, the input order can be tuned to achieve the best performance on the validation set.

In case there is no validation set available, to mitigate the impact of random input order, ties can be broken arbitrarily. The results of ties broken arbitrarily are shown in table 1800 of FIG. 18.

Support and Smatch

Referring back to FIG. 11, table 1100 shows that the average total support was highly correlated with the Smatch score. Statistically significant tests were performed to support the given hypothesis. Below is the correlation between the "Normalized total support" (the total support normalized to the size of the graph) and the Smatch score, together with the p-value for each dataset:

AMR 2.0: Pearson correlation=0.60, p-value=2.7e-117
AMR 3.0: Pearson correlation=0.49, p-value=2.6e-137
BIO: Pearson correlation=0.55, p-value=0.0
LP: Pearson correlation=0.56, p-value=3.4e-130
New3: Pearson correlation=0.73, p-value=5.1e-191

The overall correlation between the "Normalized total support" and the Smatch score, together with the p-value for all datasets is: Pearson correlation=0.67, p-value=0.0.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
receiving a set of graph predictions corresponding to an input text, where each graph prediction of the set of graph predictions is generated by a different machine learning model and each graph prediction is a semantic representation graph of the input text;
for each graphs prediction:
comparing a current graph prediction to each other graph prediction of the set of graph predictions;
counting, for each other graph prediction, a vote for each common edge and node; and
blending, based on the comparing and the counting, the current graph prediction to generate a first blended graph; and
adding the first blended graphs to a plurality of candidate blended graphs, where nodes and edges of the candidate blended graphs have respective selection metric values, generated using a selection metric function, that meet a minimum threshold; and
selecting as an output blended graph a candidate blended graph of the plurality of candidate blended graphs having a highest total combination of selection metric values among the plurality of candidate blended graphs.

2. The computer-implemented method of claim 1, wherein blending the graph predictions of the set of graph predictions to generate the plurality of candidate blended graphs comprises:
identifying a graph prediction of the set of graph predictions as a first pivot graph;
comparing the first pivot graph to other graph predictions of the set of graph predictions, utilizing the selection metric function to determine respective selection metric values for the nodes and edges of the first pivot graph based, at least in part, on nodes and edges of the other graph predictions; and modifying the first pivot graph based, at least in part, on the selection metric values for the nodes and edges of the first pivot graph, yielding a first candidate blended graph.

3. The computer-implemented method of claim 2, wherein modifying the first pivot graph includes removing from the first pivot graph a node or edge that does not meet the minimum threshold.

4. The computer-implemented method of claim 2, wherein modifying the first pivot graph includes adding to the first pivot graph a node or edge that meets the minimum threshold from a graph prediction of the other graph predictions.

5. The computer-implemented method of claim 2, wherein modifying the first pivot graph includes modifying a label of a node or edge of the first pivot graph based, at least in part, on the selection metric value for the node or edge of the first pivot graph and on a selection metric value for a node or edge of a graph prediction of the other graph predictions.

6. The computer-implemented method of claim 1, wherein the selection metric function provides an approximation of a maximum matching between respective graphs.

7. The computer-implemented method of claim 6, wherein the approximation is calculated utilizing a hill climbing algorithm.

8. The computer-implemented method of claim 1, further comprising utilizing the output blended graph in a question answering task.

9. The computer-implemented method of claim 1, further comprising utilizing the output blended graph in a common-sense reasoning task.

10. The computer-implemented method of claim 1, wherein the total combination of selection metric values for a respective candidate blended graph is a sum of the respective selection metric values for the nodes and edges of the respective candidate blended graph.

11. A computer program product comprising one or more computer readable storage media and program instructions collectively stored on the one or more computer readable storage media, the program instructions executable by one or more computer processors to cause the one or more computer processors to perform a method comprising:
  receiving a set of graph predictions corresponding to an input text, where each graph prediction of the set of graph predictions is generated by a different machine learning model and each graph prediction is a semantic representation graph of the input text;
  for each graphs prediction:
    comparing a current graph prediction to each other graph prediction of the set of graph predictions;
    counting, for each other graph prediction, a vote for each common edge and node;
    blending, based on the comparing and the counting, the current graph prediction to generate a first blended graph; and
    adding the first blended graphs to a plurality of candidate blended graphs, where nodes and edges of the candidate blended graphs have respective selection metric values, generated using a selection metric function, that meet a minimum threshold; and
  selecting as an output blended graph a candidate blended graph of the plurality of candidate blended graphs having a highest total combination of selection metric values among the plurality of candidate blended graphs.

12. The computer program product of claim 11, wherein blending the graph predictions of the set of graph predictions to generate the plurality of candidate blended graphs comprises:
  identifying a graph prediction of the set of graph predictions as a first pivot graph;
  comparing the first pivot graph to other graph predictions of the set of graph predictions, utilizing the selection metric function to determine respective selection metric values for the nodes and edges of the first pivot graph based, at least in part, on nodes and edges of the other graph predictions; and
  modifying the first pivot graph based, at least in part, on the selection metric values for the nodes and edges of the first pivot graph, yielding a first candidate blended graph.

13. The computer program product of claim 11, wherein the selection metric function provides an approximation of a maximum matching between respective graphs.

14. The computer program product of claim 11, wherein the total combination of selection metric values for a respective candidate blended graph is a sum of the respective selection metric values for the nodes and edges of the respective candidate blended graph.

15. A computer system comprising:
  one or more computer processors; and
  one or more computer readable storage media;
  wherein:
    the one or more computer processors are structured, located, connected and/or programmed to execute program instructions collectively stored on the one or more computer readable storage media; and
    the program instructions, when executed by the one or more computer processors, cause the one or more computer processors to perform a method comprising:
      receiving a set of graph predictions corresponding to an input text, where each graph prediction of the set of graph predictions is generated by a different machine learning model and each graph prediction is a semantic representation graph of the input text;
      for each graphs prediction:
        comparing a current graph prediction to each other graph prediction of the set of graph predictions;
        counting, for each other graph prediction, a vote for each common edge and node; and
        blending, based on the comparing and the counting, the current graph prediction to generate a first blended graph; and
        adding the first blended graphs to a plurality of candidate blended graphs, where nodes and edges of the candidate blended graphs have respective selection metric values, generated using a selection metric function, that meet a minimum threshold; and
      selecting as an output blended graph a candidate blended graph of the plurality of candidate blended graphs having a highest total combination of selection metric values among the plurality of candidate blended graphs.

16. The computer system of claim 15, wherein blending the graph predictions of the set of graph predictions to generate the plurality of candidate blended graphs comprises:
  identifying a graph prediction of the set of graph predictions as a first pivot graph;

comparing the first pivot graph to other graph predictions of the set of graph predictions, utilizing the selection metric function to determine respective selection metric values for the nodes and edges of the first pivot graph based, at least in part, on nodes and edges of the other graph predictions; and modifying the first pivot graph based, at least in part, on the selection metric values for the nodes and edges of the first pivot graph, yielding a first candidate blended graph.

17. The computer system of claim 15, wherein the selection metric function provides an approximation of a maximum matching between respective graphs.

18. The computer system of claim 15, wherein the total combination of selection metric values for a respective candidate blended graph is a sum of the respective selection metric values for the nodes and edges of the respective candidate blended graph.

* * * * *